Figure 1:
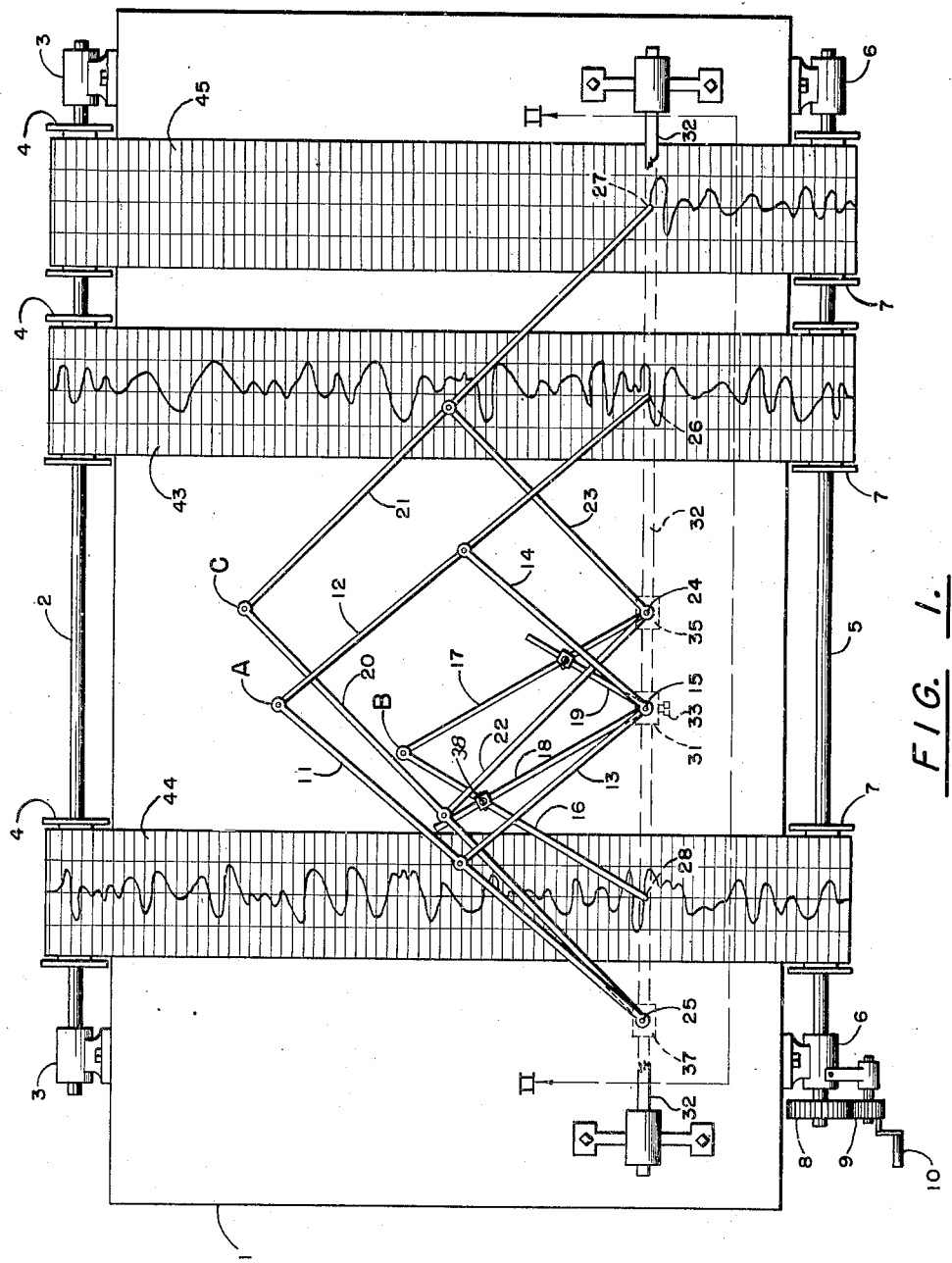

May 25, 1948.

C. T. SHEWELL ET AL 2,442,098

APPARATUS FOR INTERPRETATION OF SPECTRUM
ANALYSIS DATA REPRESENTED BY A CURVE

Filed Nov. 13, 1945

2 Sheets-Sheet 1

INVENTORS.
Charles T. Shewell, John R. Shewell
BY
J S McKean
ATTORNEY.

May 25, 1948.　　　　C. T. SHEWELL ET AL　　　　2,442,098
APPARATUS FOR INTERPRETATION OF SPECTRUM
ANALYSIS DATA REPRESENTED BY A CURVE
Filed Nov. 13, 1945　　　　2 Sheets-Sheet 2

Patented May 25, 1948

2,442,098

UNITED STATES PATENT OFFICE 2,442,098

APPARATUS FOR INTERPRETATION OF SPECTRUM ANALYSIS DATA REPRESENTED BY A CURVE

Charles T. Shewell, Baytown, Tex., and John R. Shewell, Auburn, Ala., assignors to Standard Oil Development Company, a corporation of Delaware Application November 13, 1945, Serial No. 628,068

7 Claims. (Cl. 234—1)

The present invention is directed to an apparatus for the correction and interpretation of data which may be represented by a curve, the shape of which requires correction for factors which may be represented by a second curve. More specifically, the apparatus is adapted for use in the correction of an analytical curve obtained by a spectrum analysis method where the analytical curve requires correction for the masking effect of different components of the mixture represented by the curve on other components of the mixture.

Various kinds of spectrum analyses have been developed for analyzing mixtures. Among these may be mentioned the infrared absorption spectrum analyses, the ultraviolet spectrum analyses, the Raman emission spectrum analyses and the mass spectrum analyses. The absorption methods depend upon the ability of individual compounds or substances to absorb light of certain specific wave lengths in that portion of the spectrum ranging from about 2000 to about 250,000 angstroms. The difficulty is encountered that any given compound will exhibit absorptive power for more than one wave length or in other words will produce a spectrum having a plurality of peaks of different magnitudes. Thus, when the spectrum of a mixture is produced, the magnitude of any one peak cannot be attributed to one individual component, but is the resultant of the effect of several components. Consequently, in order for the spectrum to be interpreted, it is necessary to correct each significant peak in it for the effect of the various components which might contribute to that peak.

Likewise, in the emission method, one given compound may emit light of different and often widely separated wave lengths with the result that the emission spectrum of the mixture again contains peaks, the magnitude of which can not be wholly ascribed to any one component.

Also, in the spectrum obtained by the use of the mass spectrograph, account must be taken of the fact that a given compound will influence different parts of the spectrum and any one part of the spectrum may be influenced by a number of compounds. Here again, therefore, it is necessary to correct the spectrum by taking into account the effect of various possible components on the different parts of the spectrum.

In all these methods there have in the past been two methods for interpreting and analyzing a spectrum of the mixture analyzed. The first method involves drawing a conclusion from the various peaks on the spectrum as to the number and identity of the components in the mixture, then writing down equations equal in number to the components, each equation representing the summation of the effects of the individual components on each of the peaks appearing on the spectrum and the simultaneous solution of these equations. This constitutes a laborious and intricate mathematical analysis, the results of which are not reliable because the entire computation is based on an assumption as to the number of components in the mixture, which need not necessarily be valid.

In the other method there is selected from the spectrum a distinctive peak which is more uniquely characteristic of one given component than the others. By comparison of this peak with the spectrum of this component in its pure state an estimate is made of the content of this component in the mixture. On the basis of this estimate the other peaks on the spectrum are corrected for the effect of this component upon them and there is thus produced a second spectrum. The second spectrum is then revised in the same way on the basis of another component which appears to be most prominent in it and in this manner there are produced a number of spectra corresponding to the number of components in the mixture. The last of these spectra is theoretically a fairly accurate picture of the effect of one component on a particular wave length or band of wave lengths and is assumed to constitute a close approximation of the content of that component in the mixture. Using the content of that component then, the whole procedure is repeated beginning with the original spectrum of the mixture and terminating with the best approximation of the content of another component. With this component then the procedure is repeated and so on until by these successive approximations the most accurate approximation of the composition of the mixture is obtained.

This method, however, suffers from serious drawbacks. Its accuracy is in the first place dependent upon the number of peaks, or the number of points on the original spectrum, which are selected for correction. Obviously, because of the painstaking nature of the procedure, practicality dictates that the original number of points selected on the spectrum be limited. As a consequence, it is possible to miss entirely the presence of one or more minor components in the mixture. The apparatus of the present invention allows the original spectrum to be corrected in effect for an infinite number of points. This is done mechanically in a simple operation requiring only a fraction of the time required for the previous methods. In other words, the apparatus of the present invention is a means for performing the point to point method just described but makes possible the correction of every point on the original spectrum for the effect of the various components. As a consequence, the analysis of the spectrum by the apparatus of the present invention eliminates the possibility of overlooking the presence of minor constituents in the mixture analyzed.

Figure 2:
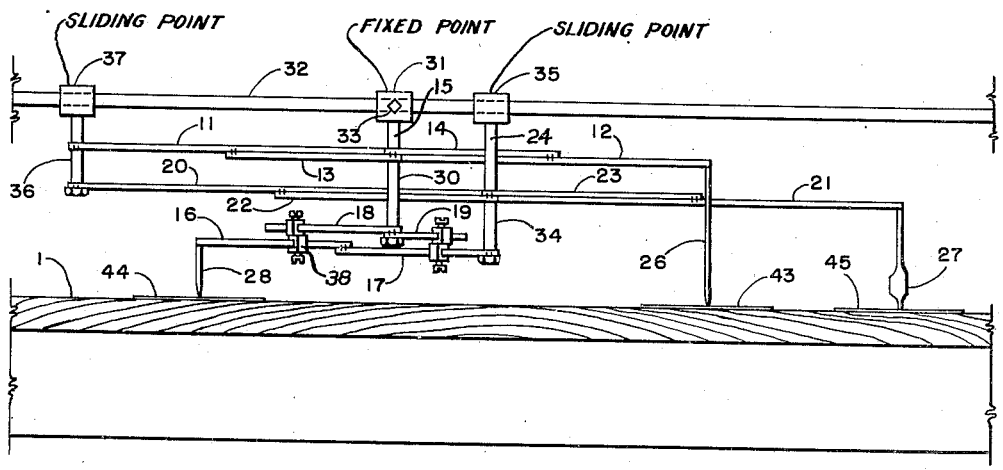
Figure 3:
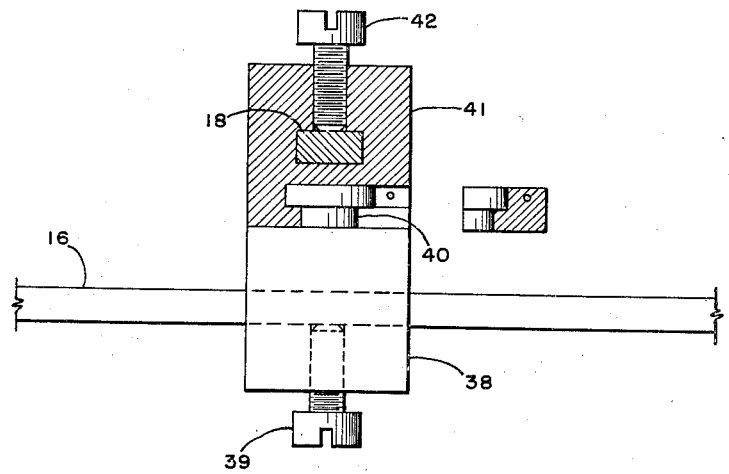

The present invention will be better understood from the following detailed description of the drawing, in which Fig. 1 is a plan view of a suitable apparatus for practicing the method of the present invention;

Fig. 2 is a vertical section along line II—II of the arrangement shown in Fig. 1; and Fig. 3 is a detail of one element of Fig. 1.

Referring to the drawing in detail, numeral 1 designates a table having at its rear a shaft 2, journaled on supports 3, carrying reels 4 of record strip and at its front end a similar shaft 5, journaled on supports 6, carrying reels 7 for receiving the record strips. One end of the shaft 5 is provided with a gear 8 in mesh with a gear 9 carrying a handle 10.

Mounted above the table is an assembly of pantographs which may be identified by letters A, B and C. Pantograph A has legs 11 and 12 and links 13 and 14. The links are pivoted to the legs and to a fixed center 15. Pantograph B has legs 16 and 17 and links 18 and 19. These links are pivoted to the legs and also to the fixed center 15. Pantograph C has legs 20 and 21 and links 22 and 23. These links are pivotally connected to the legs and to each other at a sliding center 24.

The legs 11 and 20 of pantographs A and C are pivotally connected to a sliding point 25. Leg 12 of pantograph A carries at its free end a stylus or pointed member 26. Leg 21 of pantograph C carries at its free end a stylus or marking element 27. Leg 16 of pantograph B carries at its free end a stylus or pointed member 28. Leg 17 of pantograph B is pivotally connected to the moving point 24.

At the fixed center 15 is an upright post 30 to which is threadedly connected a sleeve 31 which is slidably mounted on a horizontal rod 32 parallel to the plane and to the edge of the table. The sleeve 31 is provided with a suitable set screw 33 to hold it in fixed position. At the sliding point 24 there is also an upright post 34 threadedly connected to a second sleeve 35 slidably mounted on the rod 32. At the sliding point 25 there is a third post 36 threadedly connected to a third sleeve 37 slidingly mounted on the rod 32. This arrangement constrains the moving points 24 and 25 to move in alignment with each other and with the fixed center 15.

The links 18 and 19 of pantograph B are adjustable with respect to their pivotal connections to legs 16 and 17, respectively, thereby making adjustable the movement of the outer extremities of these legs with respect to each other and to fixed center 15. A suitable construction for the pivot points between these links and their respective legs is shown in Fig. 3 in which leg 16 is shown carrying a slidable collar 38 provided with a set screw 39 and connected by a swivel joint 40 to a second collar 41 which is slidably mounted on the link 18 and is provided with a set screw 42. Links 18 and 19 are made adjustable with respect to legs 16 and 17 so as to make it possible to regulate the percentage of the movement of the stylus 28 which is subtracted from the movement of the stylus 26. It will be apparent that in making adjustments of these links, pantograph B is adjusted to form an unsymmetrical pantograph.

In the present description and in the claims, reference is made to symmetrical and unsymmetrical pantographs. It is to be understood that a "symmetrical pantograph" means a pantograph in which the legs and confining linkages define an equilateral parallelogram. Similarly, an "unsymmetrical pantograph" designates one in which the legs and confining linkages define a non-equilateral parallelogram, that is, a parallelogram in which two parallel sides are of a length which is different from the lengths of the other two parallel sides. It is to be understood that the term "short leg" of an unsymmetrical pantograph refers to the leg which is parallel to one of the long sides of the parallelogram, while the term "long leg" refers to the leg which is parallel to the short side of the parallelogram.

Record strips are threaded from the reels 4 across the table 1 under the pantograph arrangement to the reels 7. In the embodiment illustrated, the middle recording strip 43 is, for example, the spectrum of a mixture of hydrocarbons obtained by the use of a mass spectrometer. Record strip 44 is the mass spectrum of a pure hydrocarbon, such as propane, butane, etc., obtained by the use of a mass spectrometer. Record strip 45 is blank and, as will be explained hereinafter, receives a trace which represents a percentage of the difference between the trace shown on record strip 43 and the trace shown on record strip 44. The stylus 28 is manipulated to follow the trace on strip 44 as the latter moves across the table. The stylus 26 is manipulated to follow the trace on record strip 43 as it moves across the table. The stylus 27, as a result of these manipulations, draws a trace on the record strip 45 as it moves across the table.

In using this arrangement for the interpretation of the spectrum of a mixture of vaporous substances, such as hydrocarbons, obtained by the use of a mass spectrometer, for example, the record strip carrying the spectrum is placed on the middle reel 4. At the same time a blank record strip is placed on the reel 4 to the right and a record strip bearing the spectrum of a pure compound contained in the mixture and obtained by the use of a mass spectrometer is placed on the reel 4 to the left. These record strips are then carried across the table to the respective reels 7, the styluses 28 and 26 are placed on their respective traces, the handle 10 is turned to move the strips across the table and the styluses 28 and 26 are manipulated to follow their respective traces. As these styluses move, stylus 27 moves in correspondence and produces a trace on the record strip 45.

In order to illustrate the manner in which the ratio between the links 18 and 19 is determined, one may consider the interpretation of a spectrum, obtained by the use of a mass spectrometer, of a hydrocarbon mixture containing from $C_1$ to $C_6$ hydrocarbons. The spectrum of this mixture will contain a number of peaks. Almost invariably there will be one peak which is uniquely associated with one of the compounds contained in the mixture. The height of this peak on the spectrum of the mixture is then compared to the height of the same peak on the spectrum of the pure compound represented by that peak and the ratio between these two is then divided by two and the resultant ratio is taken to be the desired ratio of the distance between points 15 and 24 and the distance between point 15 and stylus 28. It will be observed that the important lengths in this arrangement are the distance between points 15 and 24 and the distance between point 15 and stylus 28 and that the links 19 and 18 are always so adjusted that the ratio between these lengths will be one-half of the ratio between a selected peak on the record strip 43 and the corresponding peak on the record strip 44. When this precaution is observed, the trace produced on the record strip 45 will be the spectrum of the composition represented by the trace on record strip 43 minus the pure compound, the spectrum of which is represented by the trace on record strip 44.

To illustrate further the use of the apparatus of our invention, let it be assumed that a 50:50 mixture of normal butane and propane has been analyzed in a mass spectrometer and that a sample of pure, normal butane has similarly been analyzed. Let it also be assumed that an ionic mass corresponding to a molecular weight 58 (hereinafter called "mass 58") produces a completely unique peak on a mass spectrum record for normal butane. For purposes of illustration let it further be assumed that the height of the mass 58 peak in the spectrum of normal butane is 10 units and that the height of the mass 58 peak in the mixture is 5 units. As is well known by a worker skilled in the art of mass spectrum analysis, the height of a mass peak in a spectrum is proportional to the concentration of the substance contributing that mass in the mixture.

With these facts and assumptions in mind, the lengths of links 18 and 19 are adjusted with respect to legs 16 and 17 so that link 19 is parallel to leg 16, link 18 is parallel to leg 17 and the measured distance between point 15 and point 24 is one-fourth (i. e. one-half the ratio 5:10) the measured distance between points 15 and stylus 28. The position of sleeve 31 and, accordingly, point 15 may then be adjusted and fixed so that when stylus 26 is placed at the zero coordinate on strip 43 and stylus 28 is simultaneously placed on the zero coordinate on strip 44, stylus 27 will take up a position at the zero coordinate on strip 45. Having thus fixed and locked point 15 in this position by means of set screw 33, it will be seen that, if stylus 26 is temporarily held at the zero coordinate on chart 43 and if stylus 28 is then moved 10 units of distance toward the right corresponding to the peak height of mass 58 which has been assumed on strip 44, it will be found that sleeve 35 moves two and one-half units of distance toward the left and stylus 27 moves 5 units to the left. Now if stylus 28 be held in its new position and if stylus 26 be moved five units of distance toward the right corresponding to the peak height of mass 58 assumed to appear on chart 43, it will be found that sleeve 37 moves five units toward the left and stylus 27 moves five units toward the right. It will be apparent then that stylus 27 makes a net change of position of zero units with respect to its starting position. This agrees with the assumption used for illustrative purposes that the peak for mass 58 was unique for normal butane since subtracting this peak out of the peak for the mixture left no residual peak to be drawn by stylus 27.

As will be apparent to a worker skilled in the art of mass spectrum analysis, a further scanning of all the peaks appearing upon strips 43 and 44 will completely eliminate the contributions made by normal butane at all points in the spectrum of the mixture. To illustrate this, examination may be made of the spectrum for an ionic mass corresponding to a molecular weight 42 (hereinafter called "mass 42") to which both constituents of the propane-butane mixture contribute in a mass spectrum analysis. For purposes of illustration, let it be assumed that, in the analysis of pure propane, the mass 42 shows a peak height of 18 units and, in a similar analysis of normal butane, mass 42 shows a peak height of 12 units. From the known facts of the additivity of peak heights and from the immediately preceding assumptions, it will be seen that the peak height in the originally assumed mixture is $(0.5 \times 12) + (0.5 \times 18) = 15$. With pantograph B set as previously described so that the distance between point 15 and point 24 is one-fourth the distance between the point 15 and stylus 28, it can be shown that if stylus 26 is again temporarily held at the zero coordinate while the stylus 28 is moved twelve units to the right from the zero coordinate on strip 44, point 24 will move three units to the left and stylus 27 will move six units to the left. If stylus 28 is then held in the new position, and stylus 26 is moved fifteen units to the right corresponding to the peak height for mass 42 in the mixture, stylus 27 will move fifteen units to the right or a net change of position of nine units toward the right. In other words, if instead of moving styluses 26 and 28 stepwise these styluses had been moved in unison, the stylus 27 would have described a trace which would be a percentage of the difference between the traces assumed on strips 43 and 44.

If the chart thus traced on strip 45 is now moved to replace the strip 43 and a strip containing the mass spectrum of pure propane is employed in place of the spectrum of pure butane on strip 44 and if the lengths of links 18 and 19 are readjusted, if necessary, in accordance with the ratio of heights of a unique peak in the pure propane spectrum, it will be found upon simultaneous manipulation of stylus 26 and 28 during movement of new strips 43 and 44 that stylus 27 traces a straight line on new strip 45.

It will be seen, therefore, that first in interpreting the spectrum of a mixture of the character described above the operator subtracts from the spectrum of the mixture a definite proportion of the spectrum of one of the compounds contained in the mixture. He then takes the resulting trace obtained from the strip 45, makes this the middle strip, substitutes for the strip 44 another strip containing the spectrum of another pure compound still remaining in the mixture and repeats the operation to produce on a new record strip 45 a second trace which represents the original spectrum with two of its components subtracted. This sequence of operations may be continued to resolve the initial spectrum of the mixture to a spectrum of one component of the mixture which will be a close approximation of the actual content of that component in the mixture. If every operation in the process is accurate, the final trace produced on record strip 45 by subtracting a selected proportion of the spectrum of the final pure compound from the residual of the initial spectrum of the mixture should be a straight line. The amount by which this last trace on the last record strip 45 deviates from a straight line indicates that a correction should be made in the adjustment of the lengths of links 18 and 19 in one or more of the operations. The earlier operation in which this adjustment is necessary will be indicated by the location of the deviations from the straight line on the final record strip 45. For instance, if in the interpretation of the spectrum of a composition of the aforesaid type all of the spectra of the pure compounds have been subtracted from the spectrum of the mixture except methane and the spectrum of pure methane is then subtracted from the residue of the initial spectrum, which should represent the content of methane in the mixture, and the trace on record strip 45, as a result of this substraction, shows a hump or peak at an ionic mass corresponding to a molecular weight of 57 or 58, for example, then the operator knows that he has not fully subtracted the butane from the initial spectrum and, therefore, knows that it is in this operation that a readjustment of the lengths of arms 18 and 19 is required. He then goes back to this particular subtraction with the aforesaid readjustment and repeats the operations from that point on.

Alternatively, the operator may correct the final trace for deviations from a straight line shown in it in the following manner. Let it be assumed again that all of the hydrocarbons except methane have been substracted from the spectrum of the mixture producing a trace on record strip 45 which should represent the methane content of the mixture. Then this record strip 45 is given the middle position and is run through the device with the spectrum of pure methane, producing a trace on new record strip 45 which should be a straight line if the analysis has been correct. Let it be assumed that instead of a straight line the trace on new record strip 45 has a hump at mass 57 or 58. Then, instead of repeating several operations to correct for butane, this new record strip 45 is placed in the middle position and is run through the device with the spectrum of pure butane with the links 18 and 19 adjusted so that the ratio of the distances between points 15 and 24 and point 15 and stylus 28 is one-half the ratio between the hump at mass 57 or 58, as the case may be, on the middle record strip, and the corresponding hump on the trace representing pure butane. Then if the error was due to butane, the trace produced on the new record strip 45 should be a straight line. If this last trace on strip 45 is not a straight line after this correction, then the operator knows that the initial mixture contained a compound which he has not accounted for. He may not be able to determine what the undetected compound is, but he at least knows that it is present. Other known methods for interpreting these spectra will not reveal the presence of an undetected compound in this manner. Knowing that such a compound is present, the operator can perhaps rerun the spectrum of the mixture with a change in sensitivity or with certain portions of the spectrum amplified in order to produce a spectrum containing a peak which will assist him in identifying the previously undetected compound.

While a specific embodiment of the present invention has been shown in the drawing and described in the specification it will be understood that mechanical features of the device and the structural design and configuration can be varied widely without departing from the scope of the present invention.

The nature and objects of the present invention having been fully described and illustrated, what is claimed as new and useful and is desired to be secured by Letters Patent is:

1. A device for producing a trace representing a predetermined percentage of the difference between two given traces comprising means for moving said given traces and the medium for receiving the desired trace in a given direction in unison and in parallel relation, a group of three pantographs mounted adjacent said traces and said medium, one of said pantographs being unsymmetrical and the other two being symmetrical, the former being so constructed that the ratio of the distance between its center and the extremity of its short leg and the distance between its center and the extremity of its long leg is always one-half the aforesaid percentage, the extremity of one leg of one of said symmetrical pantographs being pivoted to the extremity of one leg of the other of said symmetrical pantographs, one of the symmetrical pantographs and said unsymmetrical pantographs having a common fixed center, the other of said symmetrical pantographs having a moving center, the extremity of the short leg of said unsymmetrical pantograph being connected to said moving center, the extremity of the long leg of said unsymmetrical pantograph carrying a follower for one of said given traces, the extremity of the free leg of one of said symmetrical pantographs having a fixed center carrying a follower for the other of said given traces, the extremity of the free leg of the other of said symmetrical pantographs carrying a marker for making the desired trace on said medium, and means for maintaining the extremities and centers of said pantographs in a straight line perpendicular to the line of travel of said given traces and said medium and parallel to a line passing through said traces and said medium perpendicular to their line of travel.

2. A device for producing a trace representing a predetermined percentage of the difference between two given traces comprising a flat surface, means for moving said given traces and the medium for receiving the desired trace across said surface in unison and in parallel relation, a group of three pantographs mounted to work on said flat surface, one of said pantographs being unsymmetrical and the other two being symmetrical, the former being so constructed that the ratio of the distance between its center and the extremity of its short leg and the distance between its center and the extremity of its long leg is always one-half the aforesaid percentage, the extremity of one leg of one of said symmetrical pantographs being pivoted to the extremity of one leg of the other of said symmetrical pantographs, one of the symmetrical pantographs and said unsymmetrical pantograph having a common fixed center, the other of said symmetrical pantographs having a moving center, the extremity of the short leg of said unsymmetrical pantograph being connected to said moving center, the extremity of the long leg of said unsymmetrical pantograph carrying a follower for one of said given traces, the extremity of the free leg of one of said symmetrical pantographs having a fixed center carrying a follower for the other of said given traces, the extremity of the free leg of the other of said symmetrical pantographs carrying a marker for making the desired trace on said medium, and means for maintaining the extremities and centers of said pantographs in a straight line perpendicular to the line of travel of said given traces and lying in a plane parallel to said surface.

3. A pantograph arrangement for producing a trace representing a desired resultant of two given traces comprising three pantographs, a first and second of which have a common fixed center and the third of which has a movable center, said second and third pantographs being symmetrical and said first pantograph being so constructed that the distance between its center and the extremity of its short leg bears a fixed ratio different from 1:1 to the distance between its center and the extremity of its long leg, the extremity of its short leg being connected to the movable center of said third pantograph and the extremity of its long leg being connected to means for following one of said given traces, means connected to the extremity of one leg of said second pantograph for following the other of said traces, means connecting the extremity of the other leg of said second pantograph to the extremity of one leg of the third pantograph and means connected to the extremity of the other leg of said third pantograph for producing the resultant trace.

4. A pantograph arrangement for producing a trace representing a desired resultant of two given traces comprising three pantographs, a first and second of which have fixed centers and the third of which has a movable center, said second and third pantographs being symmetrical and said first pantograph being so constructed that the distance between its center and the extremity of its short leg bears a fixed ratio other than 1:1 to the distance from its center to the extremity of its long leg, the extremity of its short leg being connected to the movable center of said third pantograph and the extremity of its long leg being connected to means for following one of said given traces, means connected to the extremity of one leg of said second pantograph for following the other of said traces, means connecting the extremity of the other leg of said second pantograph to the extremity of one leg of the third pantograph, means connected to the extremity of the other leg of said third pantograph for producing the resultant trace, and means for maintaining the centers and extremities of said pantographs in a straight line.

5. A device for producing a trace representing a predetermined percentage of the difference between two given traces comprising a tracing and marking surface, means for moving said given traces and the medium for receiving the desired trace across said surface in unison and in parallel relation in the same direction, a pair of followers and a marker arranged to work on said surface, a system of pantographs each having a center and legs having free ends, means maintaining the centers of a first and second pantograph in a common point in a straight line perpendicular to the direction of motion of said given traces and said medium and parallel to a line passing through said traces and said medium perpendicular to their direction of motion, means for maintaining the end of a leg of the second pantograph and the end of a leg of the third pantograph at a common point on said straight line and means maintaining the center of the third pantograph and the end of a leg of the first pantograph at a common point on said straight line.

6. A device in accordance with claim 5 in which the first pantograph is unsymmetrical.

7. A device in accordance with claim 5 in which the centers of the first and second pantographs are fixed at a point on said line.

CHARLES T. SHEWELL.
JOHN R. SHEWELL.

REFERENCES CITED

The following references are of record in the file of this patent:

UNITED STATES PATENTS

| Number | Name | Date |
|---|---|---|
| 1,097,378 | Thompson | May 19, 1914 |
| 1,489,782 | Newell | Apr. 8, 1924 |
| 1,601,394 | Hunsicker | Sept. 28, 1926 |
| 1,895,347 | Salomon | Jan. 24, 1933 |
| 2,128,834 | McGay | Aug. 20, 1938 |